Figure 1:
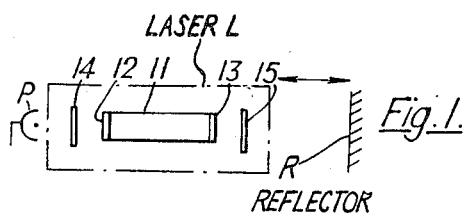

June 20, 1967  G. M. CLARKE ETAL  3,326,078
MEASURING APPARATUS EMPLOYING LASER DEVICES
Filed March 20, 1964  2 Sheets-Sheet 1

Inventors
G. M. CLARKE
N. FORBES
A. T. SHEPHERD
D. F. WALKER
By Cameron, Kerkam & Sutton
Attorneys

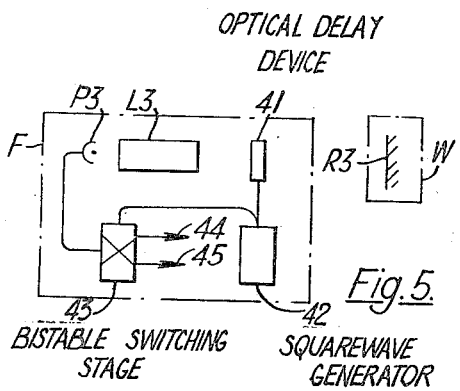
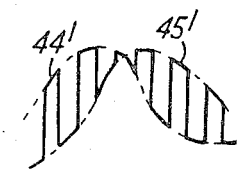
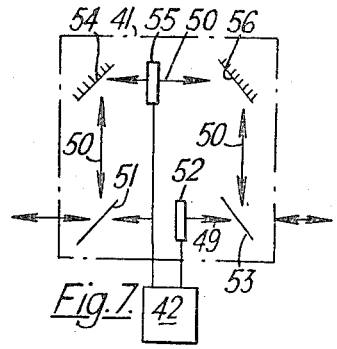
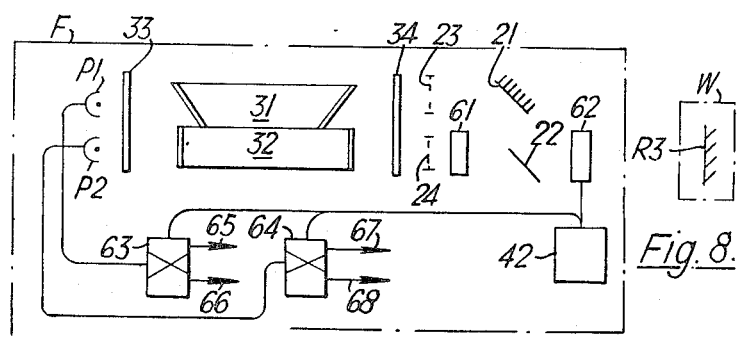

United States Patent Office 3,326,078
Patented June 20, 1967

3,326,078
MEASURING APPARATUS EMPLOYING
LASER DEVICES
Graham Morley Clarke, Neil Forbes, Alexander Turnbull Shepherd, and Donald Ferguson Walker, Edinburgh, Scotland, assignors to Ferranti, Limited, Hollinwood, England, a company of Great Britain, and Northern Ireland
Filed Mar. 20, 1964, Ser. No. 353,470
Claims priority, application Great Britain, Mar. 21, 1963, 11,165/63
11 Claims. (Cl. 88—14)

This invention relates to measuring apparatus for determining the extent and sense of the movement of a first object in one or other of two opposite directions relative to a second object.

The invention has particular but not exclusive application to measurements effected in the course of machine-tool control; in which case one of the objects may be the worktable and the other the framework of the machine. It should however be understood that the invention is not confined to such applications.

An object of the invention is to provide such apparatus which determines the extent of such movement to a very high degree of accuracy and affords an indication of the sense of the movement.

In accordance with the present invention, apparatus for determining the extent and sense of the movement of a first object in one or other of two opposite directions relative to a second object includes laser means secured to the first object and tuned to a predetermined frequency, arrangements for exciting the laser means, photoelectric transducer means disposed so as to be irradiated by the laser means and arranged to supply two electrical signals in response to such irradiation, optical reflection means secured to the second object so as to reflect back to the laser means part of the radiation therefrom, and so that in operation the relative movement of the objects causes a movement of the laser means and the reflection means towards or away from one another, thereby amplitude modulating said signals in dependence on said relative movement, there being defined in respect of said two signals two optical paths from the laser means to the reflection means and back to the laser means the lengths of which paths so differ as to cause said signals to be in quadrature with one another as regards the modulation, the leading signal being determined by the direction of said relative movement, and electrical stages for determining from said signals the extent and sense of said relative movement.

Said laser means may include two lasers respectively defining with the reflection means said two optical paths; in which case the transducer means may include for supplying said two signals two transducers responsive to the respective radiations from the lasers.

Said laser means may alternatively comprise a single laser, there being provided an optical delay device located between the laser and the reflection means and operable to one or other of two delay conditions to define with the laser and the reflection means one or other of said optical paths, as the case may be, control means for operating said device to said conditions alternately and repetitively, thereby defining said paths alternately and repetitively, two channels for said two signals respectively, and included in the transducer means a switching stage arranged to be operated by the control means to direct the signal into one or other of said channels in dependence on the condition of said device.

The expression "laser" as used throughout this specification and claims should be understood to mean a body of active material containing particles arranged to be excited to an upper of two optically-related energy levels and associated with an optical resonant cavity defined by at least two mirrors for feeding back into the material some of the energy radiated from it, thereby stimulating the emission of continuous-wave electromagnetic oscillations at a frequency within the visible range together with at least a part of such of the infra-red and ultra-violet ranges as are useful as units of measurement.

Figure 2:
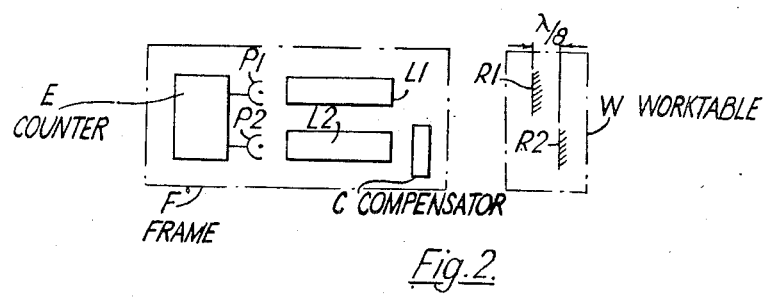
Figure 3:
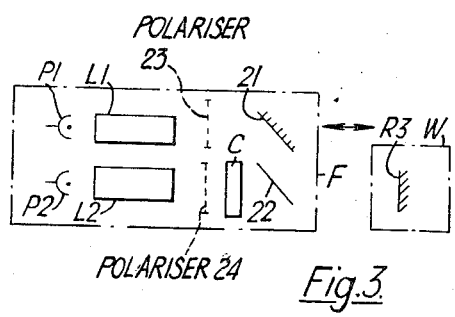
Figure 4:
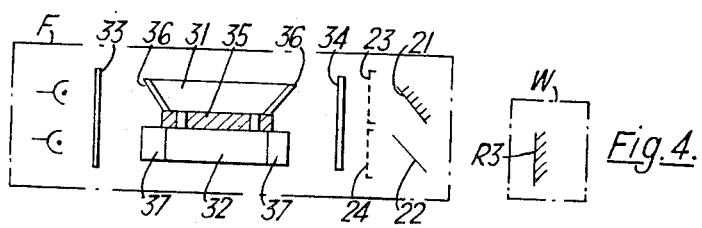

In the accompanying drawings,

FIGURE 1 is a simplified diagram showing a known measuring system employing a laser of the kind defined above, FIGURE 2 shows a measuring system in accordance with one embodiment of the invention, FIGURES 3 to 5 show variants of the arrangement of FIGURE 2 in accordance with further embodiments, FIGURE 6 shows waveforms to illustrate the operation of the embodiment of FIGURE 5, FIGURE 7 shows a detail of part of the apparatus of FIGURE 5, and FIGURE 8 is a diagram of a further embodiment.

In the known arrangement of FIG. 1, a laser L, as above defined, includes a tube 11 containing the active material and ending in windows 12 and 13. The arrangements for exciting the laser are not shown. Beyond these windows are the resonator mirrors 14 and 15 respectively; these mirrors mainly reflect the oscillatory energy back to the tube but allow a little to pass through. Beyond one of the mirrors—mirror 15, say—is placed a reflector R movable in directions towards or away from the laser and arranged to reflect back to it a small proportion of the light energy radiated from that end of it.

The distance of the reflector R from the laser determines the amplitude of the emitted radiations. If this distance is such that the reflected radiations are out of phase with the emitted radiations the amplitude of the emitted radiations is at a minimum. If R is now moved towards or away from the laser for a distance equal to a quarter wavelength at the operating frequency, the amplitude becomes a maximum. Thus a steady movement of R in one or other of those directions modulates the radiation cyclically in amplitude, to an extent that is readily detectable by a photocell P, or other convenient form of photoelectric transducer, placed to receive the radiation from the other end of the laser. The modulation would usually be sinusoidal; if it is not, a sinusoidal fundamental component may be extracted by filters from the complex wave. By connecting the cell P to a counter arranged to count the number of cycles of the modulation the movement of the object which carries reflector R may be measured to the accuracy of one half wavelength of the high-frequency radiation from the laser. The present invention makes use of this known method of measurement and affords in addition an indication of the sense of the movement.

In carrying out the invention in accordance with one form by way of example, see FIG. 2, apparatus for deriving a measurement of the movement of a work-table W towards or away from the framework F of a machine tool and for giving an indication of the direction of the movement includes, mounted on the framework F, two lasers L1 and L2 each similar to laser L described above with reference to FIG. 1 and tuned by their resonator mirrors (not shown) to the same predetermined frequency. The arrangements for exciting the lasers are also not shown. Also mounted on frame F at one end of each laser is a photoelectric transducer or photocell P1 or P2, as the case may be, corresponding to photocell P of FIG. 1, and disposed so as to be irradiated by the emission from that end of the laser. The two signals from the photocells which result from such irradiaiton are applied to electrical stages E the function of which will be indicated shortly.

Mounted on the worktable W to receive the radiation from the other end of each laser is optical reflection means in the form of reflectors R1 or R2, as the case may be, each corresponding to reflector R of FIG. 1 and similarly arranged so as to reflect back part of the radiation and so that the movement to be measured causes a relative movement of the reflectors and lasers towards or away from one another. There are thus defined in respect of the two signals from the photocells two optical paths— one from laser L1 to reflector R1 and back to laser L1, and the other from laser L2 out to and back from reflector R2. The respective distances of the reflectors from the lasers differ by one-eighth of the wavelength at the operating frequency, so that the overall lengths of these optical paths differ by a quarter of that wavelength.

In operation, as the worktable W moves with respect to the frame, the two signals from the photocells become amplitude modulated sinusoidally in dependence on that movement, as described above with reference to the arrangement of FIG. 1. Because of the quarter-wavelength difference between the respective lengths of the optical paths, the signals as so modulated are in quadrature with one another. Which of the modulated signals is the leading signal is dependent on whether the movement is toward or away from the frame. Hence by arranging for electrical stages E to count the cycles of the modulation algebraically in dependence on which signal is the leading signal, a measurement of the overall movement of the worktable is effected which takes account of the direction of the movement. These stages may include a bi-directional counter arranged to add pulses derived from the signal cycles for one direction of movement and subtract from the count pulses derived for the other direction, as described with reference to stages 35 and 36 of FIGURE 1 of Patent No. 2,886,717.

The optical path lengths need not differ by exactly a quarter wavelength, though that value, or an odd integral number of quarter wavelengths, usually gives the best results. The desired quadrature difference between the phases of the modulated signals may alternatively, or additionally, be ensured by means of a transparent compensating plate C located in one of the optical paths. Or the reflectors may be in alignment with one another and the quadrature shift obtained by displacing the lasers.

The wavelength at the very high operating frequency of a laser is so short that any slight tilt of the reflectors R1 and R2 due to a like displacement of the worktable is likely to disturb the phase relationship between the signals. To prevent this, the optical reflection means instead of being in the form of two reflectors may take the form of a single reflector R3 (see FIG. 3) common to both optical paths and aligned with one of the lasers—laser L2, say. The radiation from laser L1 reaches reflector R3 by way of parallel mirrors 21 and 22 mounted with the lasers on the frame F. Mirror 22 is partly transparent and is located in the optical path from laser L2 to the reflector. Between mirror 22 and reflector R3, therefore, the optical paths coincide; to avoid unwanted interaction between the beams over this common path they are polarised at right angles to one another by means of transparent plates, indicated by the broken lines 23 and 24, introduced in the respective paths where they are not in coincidence and tilted at the appropriate Brewster angle. The suppression of unwanted modes of oscillation having different frequencies is assisted if the laser windows—not shown in FIG. 3 but corresponding to windows 12 and 13 of FIG. 1—are also Brewster plates. A compensator plate C may again be included to ensure that the path lengths have the required quarter wavelength difference; alternatively, the lasers may be sufficiently displaced with respect to one another.

To avoid frequency disparities due to differential changes of laser parameters, resulting from, say, changes of temperature, where the lasers are gas lasers, the two lasers may be combined as shown in FIG. 4. Here the two laser tubes 31 and 32 share the same gas filling, the same excitation, and the same resonator mirrors 33 and 34, but with an optical shield 35 between them to prevent cross talk due to radiation emitted sideways. The shield is depicted with apertures to indicate that the gas filling is common to both tubes. The lasers are again arranged with their outputs polarised at right angles by plates 23 and 24 and by Brewster windows 36 and 37 in the respective lasers, as in the arrangement of FIG. 3, to share a common reflector R3. The operation is as before.

As a modification of the arrangement of FIG. 4, only one laser is used, the necessary two optical paths being provided for it on a time-sharing basis. Such an arrangement is shown in FIG. 5, with the single laser indicated at L3. In the common optical path between the laser and reflector R3 is placed some sort of optical delay device 41 controlled electrically by control means in the form of a squarewave generator 42 to have one or other of two delay conditions such that the effective length of the optical path from the laser to reflector R3 and back to the laser is alternately longer by a quarter wavelength and then possessed of its previous length over equal intervals of time. Thus the required two optical paths, differing in length as before, are again provided, but this time alternately and repetitively, in dependence on the condition of device 41.

The transducer means includes at the other end of the laser a single photocell P3 together with a switching stage in the form of a bistable stage 43 so operated by generator 42 as to direct the signal from the photocell into one or other of channels 45 or 45 in dependence on the condition of device 41. Thus the cell output is connected to one of the channels during each of the intervals when the optical path includes the extra quarter wavelength and to the other channel during each of the alternate intervals. The waveforms of the signals in the two channels when the worktable is moving at a steady speed are as shown at $44^1$ and $45^1$ in FIG. 6. Each is made up of amplitude samples of the sinewave that would result if the quarter wavelength were permanently included, or permanently excluded, from the optical path, as the case may be; each sinewave is indicated in broken lines. These signals may be smoothed to produce continuous waveforms if required.

As shown in FIG. 7, optical delay device 41 may include a direct optical path 49 through a partly-transmitting mirror 51, a Kerr cell 52, and another partly-transmitting mirror 53, and an indirect path 50 (longer than the direct path 49 by an odd integral number of one-eighth wavelengths) by way of reflection at mirror 51 to a fully-reflecting mirror 54, another Kerr cell 55, another fully-reflecting mirror 56, and back to the direct path at mirror 53. The Kerr cells are controlled from generator 42 so as to be light-transmissive alternately, thereby acting as shutters opening and closing the respective paths to cause the go-and-return path to be alternately lengthened and shortened by a quarter wavelength as described. Compensator plates (not shown) giving a fixed delay may be included in one or both paths if required. Where the movement of mirror R3 is expected to be slow enough, the Kerr cells may be replaced by mechanical shutters of the rotating blade kind.

Optical delay device 41 may instead consist of a block of elastic transparent material located in the combined path and mounted in a magnetostrictive frame so as to be compressed in thickness by a signal from generator 42 to change the path length. A ferromagnetic glass of the kind having magnetostrictive properties such as to allow the change of thickness to be effected directly could alternatively be employed.

By combining the arrangements of FIGS. 4 and 5, a four-phase output signal may be obtained, as shown in FIG. 8. Here the necessary quarter-wavelength difference between the polarised go-and-return paths from the lasers 31 and 32 to the common reflector R3 and back is effected by a compensator plate 61 in one of the paths. The delay device 62 now in the common path is controlled by generator 42 to have one or other of two delay conditions such as to insert and withdraw, alternately, an extra length of a half wavelength (rather than a quarter wavelength) at the operational frequency in the go-and-return path, thereby causing each path to have one or other of two overall lengths, as the case may be, which differ to that extent. Each photocell P1 and P2 is connected to switching means in the form of a bistable stage 63 or 64, as the case may be, similar to stage 43 of FIG. 5 and similarly controlled by generator 42 in synchronism with the control of device 62 to direct the output from cell P1 into one or other of channels 65 and 66 and the output from cell P2 into one or other channels 67 and 68. The arrangement is such that during each interval when the extra half wavelength is in the common optical path, the cells are connected to channels 65 and 67 respectively, and during each alternate interval to channels 66 and 68 respectively. The four approximate sinewaves which result from smoothing the signals thus sampled reach their maximum at 90 degree spacings in channels 65, 67, 66, and 68 sequentially.

Various features of the above-described embodiments may be varied within the scope of the invention. For example, the reflectors R may take the form of corner cubes. Instead of being at the ends of the lasers opposite the ends radiating energy to the reflectors R, the photocells may be at the same ends—that is, the right-hand ends of the lasers as seen in the drawings. Such an arrangement, however, is generally less convenient than that described, owing to the difficulty of preventing unwanted interaction between the radiations to the cells and those to the reflectors.

What we claim is:

1. Apparatus for determining the extent and sense of the movement of a first object in one or other of two opposite directions relative to a second object including laser means secured to the first object and tuned to a predetermined frequency, photoelectric transducer means so positioned as to be irradiated by the laser means and operable to produce two alternating electrical signals in response to such irradiation, optical reflection means secured to the second object and so positioned as to reflect back to the laser means part of the radiation therefrom, the relative movement of said first and second objects causing a relative movement of the laser means and the reflection means towards or away from one another which in turn causes modulation of the amplitude of said alternating signals in dependence on said relative movement, means providing two optical paths of different lengths from the laser means to the reflection means and back to the laser means, the difference in the lengths of said paths being such as to cause said modulated signals to be in quadrature with one another, the leading signal being determined by the direction of said relative movement of said first and second objects, and electrical stages connected to the transducer means for determining from said signals the extent and sense of said relative movement.

2. Apparatus as claimed in claim 1 wherein the laser means includes two lasers respectively defining with the reflection means said two optical paths, and the transducer means includes two transducers responsive to the respective radiations from the two lasers for producing said two signals.

3. Apparatus as claimed in claim 2 wherein the reflection means comprises a reflector common to both said optical paths, and including means for causing the paths to be in coincidence at the reflector, and optical polarisation means to prevent unwanted interaction between the respective radiations in the two paths.

4. Apparatus as claimed in claim 3 wherein the two lasers are combined to include at least one common parameter, thereby avoiding frequency disparities due to differential changes of that parameter.

5. Apparatus as claimed in claim 4 wherein the two lasers include a common gas filling, and common resonator mirrors.

6. Apparatus as claimed in claim 1 wherein the laser means comprises a single laser, and the means providing said two optical paths comprises an optical delay device located between the laser and the reflection means and operable to one or other of two delay conditions to define with the laser and the reflection means one or other of said two optical paths, and control means for operating said device to said conditions alternately and repetitively, said apparatus further including two channels for the signals produced by said transducer means, and a switching stage operable by the control means to direct the signal into one or other of said channels in dependence of the condition of said delay device, said electrical stages being connected to said channels.

7. Apparatus as claimed in claim 3 including in each of said two optical paths optical delay means operable to one or other of two delay conditions to cause said paths to have one or other of two overall lengths which differ to the extent of half a wavelength at said predetermined frequency, control means for operating said delay means to said conditions alternately and repetitively, and four channels for the signals produced by said transducer means, and wherein said transducer means includes switching means operable by the control means to direct the signal from one of said two transducers into one or other of two of said channels and the signal from the other transducer into one or other of the remaining channels, in such dependence on the condition of said delay means that the signals in said channels have a four-phase relationship, said electrical stages being connected to said channels.

8. Apparatus for determining the extent and sense of the movement of a first object in one or other of two opposite directions relative to a second object, including two lasers secured to the first object and tuned to a predetermined frequency, a photoelectric transducer for each laser so positioned as to be irradiated by that laser and operable to produce an alternating electrical signal in response to such irradiation, an optical reflector secured to the second object and so positioned as to reflect back to each laser a part of the radiation from it, the relative movement of said first and second objects causing a relative movement of the lasers and the reflector towards or away from one another which in turn causes modulation of the amplitude of said alternating signals in dependence on said movement, the lengths of the respective optical paths from the lasers to the reflector and back to the lasers so differing as to cause said modulated signals to be in quadrature with one another, the leading signal being determined by the direction of said relative movement of said first and second objects, means for causing said paths to be in coincidence at the reflector, optical polarisation means in the paths where not in coincidence to prevent unwanted interaction between the respective radiations in the paths where in coincidence, and electrical stages connected to the transducers for determining from said signals the extent and sense of said relative movement.

9. Apparatus as claimed by claim 8 wherein the lasers are combined to include at least one common parameter, thereby avoiding frequency disparities due to differential changes of that parameter.

10. Apparatus for determining the extent and sense of the movement of a first object in one or other of two opposite directions relative to a second object including a laser secured to the first object and tuned to a predetermined frequency, a photoelectric transducer so positioned so as to be irradiated by the laser and operable to produce an alternating electrical signal in response to such radiation, an optical reflector secured to the second object and so positioned as to reflect back to the laser a part of the radiation from it, the relative movement of said first and second objects causing a relative movement of the laser and the reflector towards or away from one another which in turn causes modulation of the amplitude of said alternating signal in dependence on said movement, an optical delay device located between the laser and the reflector and operable to one or other of two delay conditions to define with the laser and the reflector one or other of two optical paths from the laser to the reflector and back to the laser, the lengths of which paths differ to the extent of one quarter of a wavelength at said predetermined frequency, control means for operating said device to said conditions alternately and repetitively, thereby causing the transducer to produce two modulated signals alternately and repetitively which are in quadrature with one another, two channels for said two signals respectively, a switching stage connected between the transducer and the channels and operable in synchronism with the operation of said delay device to direct the signal from the transducer into one or other channel in dependence on the condition of said device, and electrical stages connected to said channels for determining from said signals the extent and sense of said relative movement.

11. Apparatus as claimed in claim 8 including in each of said optical paths optical delay means operable to one or other of two delay conditions to cause the paths to have one or other of two overall lengths which differ to the extent of half a wavelength at said predetermined frequency, control means for operating said delay means to said conditions alternately and repetitively, four channels for the signals produced by said transducers, and switching means connected between the transducers and the channels and operable in synchronism with the operation of said delay device to direct the signal from one transducer into one or other of two of said channels and the signal from the other transducer into one or other of the other two channels in dependence on the condition of said device, said electrical stages being connected to the transducers by way of the switching means.

References Cited
UNITED STATES PATENTS

| | | | |
|---|---|---|---|
| 2,604,004 | 7/1952 | Root | 88—141 |
| 2,848,921 | 8/1958 | Koulikovitch | 88—141 |
| 3,194,109 | 7/1965 | Erickson | 88—141 |
| 3,225,644 | 12/1965 | Schuch | 88—141 |

JOHN W. CALDWELL, *Acting Primary Examiner.*